United States Patent
Chen

(10) Patent No.: US 12,210,179 B2
(45) Date of Patent: Jan. 28, 2025

(54) BACKLIGHT KEYSWITCH AND BACKLIGHT MODULE THEREOF

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 4 days.

(21) Appl. No.: 18/368,021

(22) Filed: Sep. 14, 2023

(65) Prior Publication Data
US 2024/0118476 A1    Apr. 11, 2024

Related U.S. Application Data

(60) Provisional application No. 63/413,579, filed on Oct. 5, 2022.

(30) Foreign Application Priority Data

Mar. 17, 2023 (TW) .................. 112109986

(51) Int. Cl.
F21V 8/00 (2006.01)
G06F 3/02 (2006.01)

(52) U.S. Cl.
CPC ........... *G02B 6/0021* (2013.01); *G02B 6/005* (2013.01); *G02B 6/0068* (2013.01); *G06F 3/0202* (2013.01)

(58) Field of Classification Search
CPC .... G02B 6/0021; G02B 6/005; G02B 6/0068; G06F 3/0202
See application file for complete search history.

(56) References Cited

U.S. PATENT DOCUMENTS 2,953,668 A * 9/1960 Bassett, Jr. ............... F21S 8/00
                                                                 200/312
3,103,659 A * 9/1963 Edwards ................ H02B 15/00
                                                                 359/891
(Continued)

FOREIGN PATENT DOCUMENTS

CN          101514801 A          8/2009
CN          201758091 U          3/2011
(Continued)

OTHER PUBLICATIONS

TW Office Action dated Dec. 22, 2023 in Taiwan application No. 112110687.
(Continued)

*Primary Examiner* — Evan P Dzierzynski
*Assistant Examiner* — Jessica M Apenteng
(74) *Attorney, Agent, or Firm* — McClure, Qualey & Rodack, LLP

(57) ABSTRACT

A backlight keyswitch includes a backlight module and a keyswitch body having a cap with a symbol. The backlight module disposed under the cap includes a light guide plate, a light-blocking sheet, a backlight circuit board having first, third, and second lighting units disposed in the light guide plate and arranged sequentially along a longitudinal direction for emitting first, third, and second color lights respectively, and a micro optical layer. The light-blocking sheet is located above the backlight circuit board and has a transparent region. The light guide plate is located between the light-blocking sheet and the backlight circuit board. The micro optical layer is parallel to the light guide plate and formed corresponding to the transparent region to guide the first, second, and third color lights to the symbol and has first and second clearance regions respectively adjacent to the first and second lighting units in the longitudinal direction.

27 Claims, 8 Drawing Sheets

(56) References Cited

U.S. PATENT DOCUMENTS

| | | | | |
|---|---|---|---|---|
| 3,157,771 | A * | 11/1964 | Roeser | H01H 13/58 |
| | | | | 200/276 |
| 3,467,802 | A * | 9/1969 | Martin | H01H 13/023 |
| | | | | 200/314 |
| 3,639,745 | A * | 2/1972 | Shiki | H02B 1/048 |
| | | | | 200/314 |
| 4,346,275 | A * | 8/1982 | Iwakiri | H01H 13/023 |
| | | | | 200/314 |
| 4,535,396 | A * | 8/1985 | Guthrie | G09F 13/06 |
| | | | | 362/268 |
| 4,722,028 | A * | 1/1988 | Brannon | G01D 11/28 |
| | | | | 362/23.18 |
| 5,150,257 | A * | 9/1992 | Mohabbatizadeh | |
| | | | | H01H 13/023 |
| | | | | 349/1 |
| 5,434,377 | A * | 7/1995 | Martin | H01H 13/023 |
| | | | | 200/314 |
| 6,210,010 | B1 * | 4/2001 | Pontetti | H01H 13/023 |
| | | | | 362/85 |
| 6,558,013 | B2 * | 5/2003 | Tholin | H01H 13/023 |
| | | | | 362/85 |
| 11,144,131 | B1 | 10/2021 | Ho et al. | |
| 2009/0140891 | A1 | 6/2009 | Ragusa | |
| 2012/0275193 | A1 | 11/2012 | Yoshida | |
| 2019/0371538 | A1 | 12/2019 | Huang | |
| 2021/0082642 | A1 | 3/2021 | Ho | |
| 2021/0280379 | A1 | 9/2021 | Chen | |
| 2023/0305214 | A1 * | 9/2023 | Chen | G02B 6/006 |
| 2023/0343525 | A1 * | 10/2023 | Liu | H01H 13/023 |
| 2023/0420199 | A1 * | 12/2023 | Liu | G02B 6/0021 |

FOREIGN PATENT DOCUMENTS

| | | |
|---|---|---|
| CN | 203377146 U | 1/2014 |
| CN | 104252987 A | 12/2014 |
| CN | 214310968 U | 9/2021 |
| TW | I269993 | 1/2007 |
| TW | M321552 | 11/2007 |
| TW | 200945114 | 11/2009 |
| TW | 201419343 A | 5/2014 |
| TW | I494960 B | 8/2015 |
| TW | 201606830 A | 2/2016 |
| TW | 201624515 A | 7/2016 |
| TW | 202202980 A | 1/2022 |
| TW | 202211277 A | 3/2022 |

OTHER PUBLICATIONS

Chen, the specification, including the claims, and drawings in the U.S. Appl. No. 18/077,214, filed Dec. 7, 2022.

* cited by examiner

BACKLIGHT KEYSWITCH AND BACKLIGHT MODULE THEREOF

CROSS REFERENCE TO RELATED APPLICATIONS

This application claims the benefit of U.S. Provisional Application No. 63/413,579, filed on Oct. 5, 2022. The content of the application is incorporated herein by reference.

BACKGROUND OF THE INVENTION

1. Field of the Invention

The present invention relates to a backlight keyswitch and a backlight module thereof, and more specifically, to a backlight keyswitch forming a clearance area on a light guide plate and forming a non-linear section on a hole wall of an accommodating hole of the light guide plate for accommodating lighting units and a backlight module thereof.

2. Description of the Prior Art

In general, for providing a keyswitch lighting function, the common lighting design involves placing a circuit board with a plurality of light emitting diodes (LEDs) on a board of a keyboard, each light emitting diode corresponding to one keyswitch. Accordingly, the light emitting diode can emit light to a corresponding symbol on a cap of the keyswitch for generating the symbol lighting effect. The aforesaid lighting design usually adopts RGB LEDs composed of red, green, and blue LED chips arranged side by side. However, due to different mixing distances between the symbol and the red, green, and blue LED chips, there often arises a color shift problem in the symbol lighting effect. For example, an area of the symbol closer to the red LED chip may show a reddish color, while an area of the symbol closer to the blue LED chip may show a bluish color. This affects the lighting uniformity and the visual effect of the backlight keyswitch in use.

SUMMARY OF THE INVENTION

According to an embodiment, a backlight keyswitch provided by the present invention includes a keyswitch body and a backlight module. The keyswitch body has a cap with at least one symbol formed thereon. The backlight module is disposed under the cap. The backlight module includes a backlight circuit board, a light-blocking sheet, a light guide plate, and a micro optical layer. The backlight circuit board has a backlight source. The backlight source includes a first lighting unit, a second lighting unit, and a third lighting unit, wherein the first lighting unit, the third lighting unit, and the second lighting unit are arranged sequentially along a longitudinal direction for respectively emitting a first color light, a third color light, and a second color light different from each other. The light-blocking sheet is located above the backlight circuit board. The light-blocking sheet has at least one transparent region. The light guide plate is located between the light-blocking sheet and the backlight circuit board. The light guide plate has an accommodating hole for accommodating the backlight source. The micro optical layer is disposed in parallel to the light guide plate and formed corresponding to the at least one transparent region for guiding the first color light, the second color light, and the third color light to emit from the light guide plate, pass through the transparent region, and illuminate the at least one symbol. The micro optical layer forms a first clearance area near the first lighting unit in the longitudinal direction, and the micro optical layer forms a second clearance area near the second lighting unit in the longitudinal direction. The first color light, the third color light and the second color light are mixed in the first clearance area to obtain a first mixed color, the first color light, the third color light, and the second color light are mixed in the second clearance area to obtain a second mixed color, and the first mixed color is similar to the second mixed color.

According to another embodiment, a backlight keyswitch provided by the present invention includes a keyswitch body and a backlight module. The keyswitch body has a cap with at least one first symbol formed thereon. The backlight module is disposed under the cap and includes a backlight circuit board and a light guide plate. The backlight circuit board has a backlight source. The backlight source includes a first lighting unit, a second lighting unit, and a third lighting unit, wherein the first lighting unit, the third lighting unit, and the second lighting unit are arranged sequentially along a longitudinal direction for respectively emitting a first color light, a third color light, and a second color light. The light guide plate is disposed above the backlight circuit board and has an accommodating hole for accommodating the backlight source. A first hole wall of the accommodating hole is divided into a first section and a second section respectively corresponding to the first lighting unit and the second lighting unit, wherein the first section guides the first color light of the first lighting unit toward the second section, the second section guides the second color light of the second lighting unit toward the first section, and the first section and the second section are at least partially not parallel to the longitudinal direction.

According to another embodiment, a backlight module provided by the present invention includes a backlight circuit board, a light-blocking sheet, a light guide plate, and a micro optical layer. The backlight circuit board has a backlight source. The backlight source includes a first lighting unit, a second lighting unit, and a third lighting unit, wherein the first lighting unit, the third lighting unit, and the second lighting unit are arranged sequentially along a longitudinal direction for respectively emitting a first color light, a third color light, and a second color light different from each other. The light-blocking sheet is located above the backlight circuit board. The light-blocking sheet has at least one transparent region. The light guide plate is located between the light-blocking sheet and the backlight circuit board. The light guide plate has an accommodating hole for accommodating the backlight source. The micro optical layer is disposed in parallel to the light guide plate and formed corresponding to the at least one transparent region for guiding the first color light, the second color light, and the third color light to emit from the light guide plate to the transparent region. The micro optical layer forms a first clearance area near the first lighting unit in the longitudinal direction, and the micro optical layer forms a second clearance area near the second lighting unit in the longitudinal direction. The first color light, the third color light and the second color light are mixed in the first clearance area to obtain a first mixed color, the first color light, the third color light, and the second color light are mixed in the second clearance area to obtain a second mixed color, and the first mixed color is similar to the second mixed color.

According to another embodiment, a backlight module provided by the present invention includes a backlight circuit board and a light guide plate. The backlight circuit board has a backlight source. The backlight source includes a first lighting unit, a second lighting unit, and a third lighting unit, wherein the first lighting unit, the third lighting unit, and the second lighting unit are arranged sequentially along a longitudinal direction for respectively emitting a first color light, a third color light, and a second color light. The light guide plate is disposed above the backlight circuit board and has an accommodating hole for accommodating the backlight source. A first hole wall of the accommodating hole is divided into a first section and a second section respectively corresponding to the first lighting unit and the second lighting unit, wherein the first section guides the first color light of the first lighting unit toward the second section, the second section guides the second color light of the second lighting unit toward the first section, and the first section and the second section are at least partially not parallel to the longitudinal direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
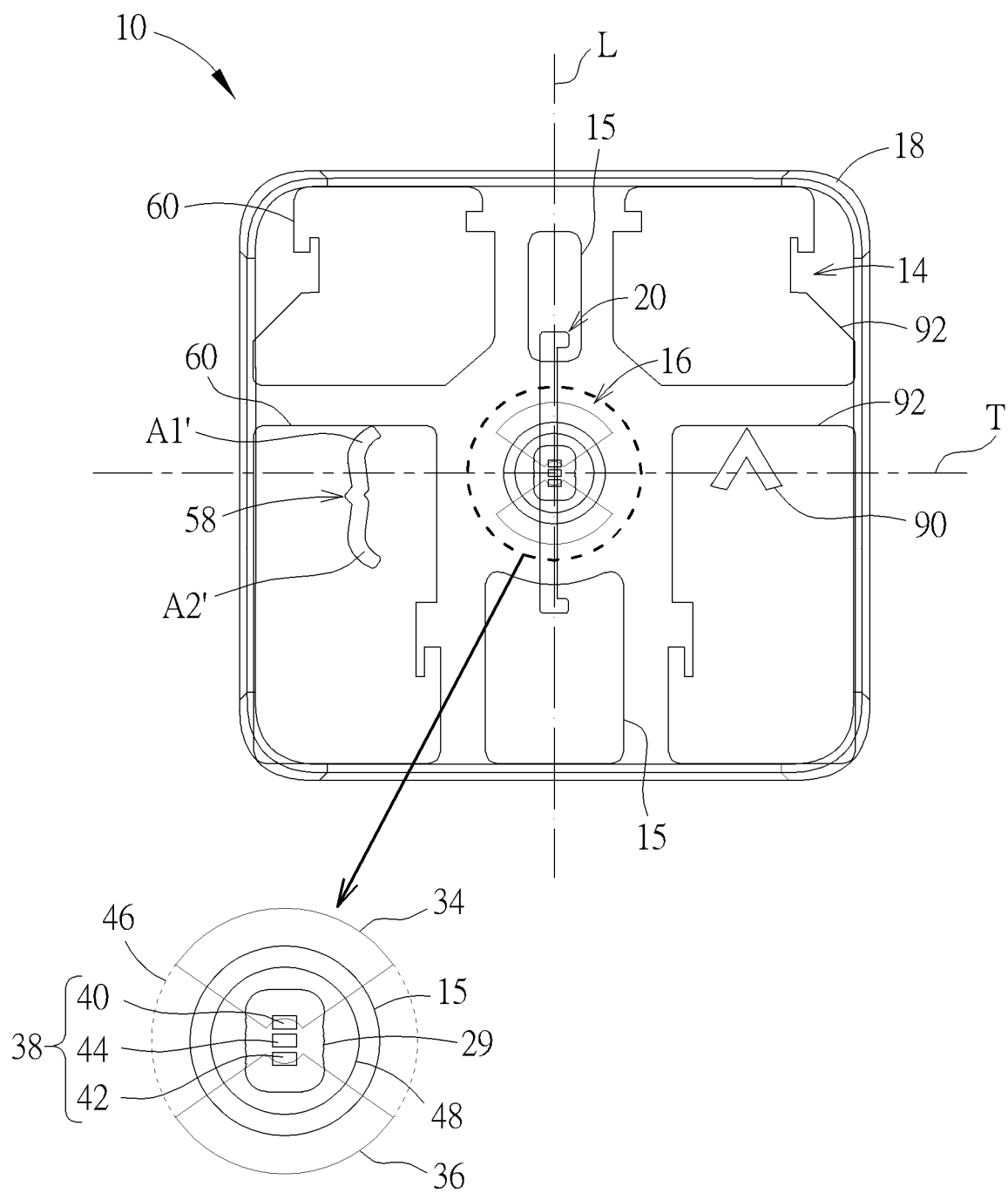
FIG. 1 is a top perspective view of a backlight keyswitch according to an embodiment of the present invention.

The present invention will now be described more specifically with reference to the following embodiments. The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the configuration of each component (e.g., size ratio of ink layers, and number, forming positions and size ratios of symbols and through holes) in the drawings is merely illustrative, not presenting an actual condition of the embodiments.

Figure 2:
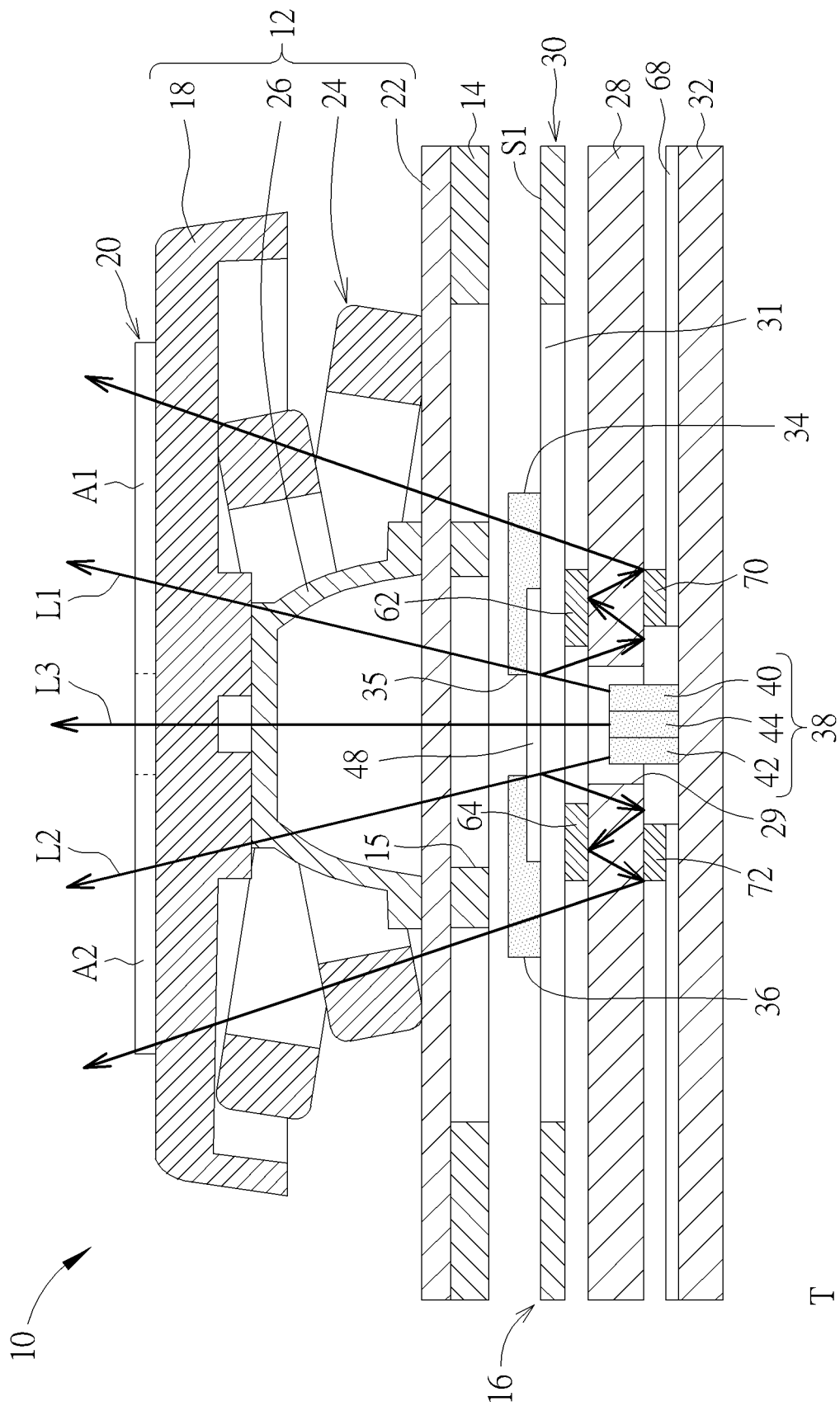
FIG. 2 is a cross-sectional diagram of the backlight keyswitch in FIG. 1 along a longitudinal direction of a cap.

Please refer to FIG. 1 and FIG. 2. FIG. 1 is a top perspective view of a backlight keyswitch 10 according to an embodiment of the present invention. FIG. 2 is a cross-sectional diagram of the backlight keyswitch 10 in FIG. 1 along a longitudinal direction L of a cap 18. For clearly showing the ink layer configuration of the backlight keyswitch 10, only the cap 18, a support plate 14, and a backlight module 16 are illustrated in FIG. 1.

The backlight keyswitch 10 could be preferably applied to a foldable electronic apparatus composed of an upper cover and a lower casing or an electronic device with a keyswitch input function (e.g., notebook or keyboard device, but not limited thereto) and provides a symbol lighting function for a user to execute a desired input function. As shown in FIG. 1 and FIG. 2, the backlight keyswitch 10 includes a keyswitch body 12, the support plate 14, and the backlight module 16. The keyswitch body 12 has the cap 18, and at least one symbol 20 (only one is shown in the middle position of the cap 18 in FIG. 1 as an example, but the number, forming positions, and sizes of symbols are not limited thereto) formed on the cap 18. The support plate 14 is disposed under the keyswitch body 12 and connected to the keyswitch body 12, so as to make the cap 18 movable up and down relative to the support plate 14. The support plate 14 has at least one through hole area 15 (three are shown in the middle position of the support plate 14 in FIG. 1 as an example, but the number, forming positions, and sizes of through holes are not limited thereto). As for the related description for other components of the keyswitch body 12, it is commonly seen in the prior art. For example, the keyswitch body 12 could further include a thin film circuit board 22, a lifting mechanism 24, and an elastic component 26 (but not limited thereto). The thin film circuit board 22 has a switch. The lifting mechanism 24 is movably disposed on the support plate 14 for supporting the cap 18 to approach or move away from the switch. The elastic force provided by the elastic component 26 can return the cap 18 to its original position for the subsequent pressing operations.

The detailed description for the ink layer design of the backlight module 16 is provided as follows. As shown in FIG. 1 and FIG. 2, the backlight module 16 is disposed under the support plate 14 and includes a light guide plate 28, a light-blocking sheet 30, a backlight circuit board 32, a first ink layer 34, and a second ink layer 36. The light guide plate 28 has an accommodating hole 29 corresponding to the keyswitch body 12. The light-blocking sheet 30 is disposed between the support plate 14 and the light guide plate 28 and has a transparent region 31 corresponding to the keyswitch body 12. The backlight circuit board 32 is disposed under the light guide plate 28 and has a backlight source 38. The backlight source 38 is disposed in the accommodating hole 29 and includes a first lighting unit 40, a second lighting unit 42, and a third lighting unit 44. As shown in FIG. 1 and FIG. 2, the first lighting unit 40, the third lighting unit 44, and the second lighting unit 42 are sequentially arranged along the longitudinal direction L and emit a first color light L1, a third color light L3, and a second color light L2 respectively to pass sequentially through the transparent region 31 and the through hole area 15 and then be incident to the symbol 20 after light mixing, so as to generate the symbol lighting effect. The first lighting unit 40 is preferably a blue light emitting diode emitting the first color light L1 (i.e., blue light), the second lighting unit 42 is preferably a red light emitting diode emitting the second color light L2 (i.e., red light), and the third lighting unit 44 is preferably a green light emitting diode emitting the third color light L3 (i.e., green light). The present invention is not limited thereto. The types and configurations of these colors could vary depending on the practical lighting application of the backlight keyswitch 10. For example, in another embodiment, the first lighting unit 40 could be a green light emitting diode, and the third lighting unit 44 could correspondingly be a blue light emitting diode.

The first ink layer 34 is formed on the light-blocking sheet 30. The first ink layer 34 is formed corresponding to a first color shift area A1 of the symbol 20 (the color shift range shown in FIG. 2, but not limited thereto) in FIG. 2 as an example, but the forming position of the first ink layer 34 is not limited thereto, meaning that as long as the first ink layer 34 is formed on the light-blocking sheet 30, whether light is directly incident to the keyswitch body 12 or travels from the light guide plate 28 to the keyswitch body 12, the first ink layer 34 can improve the overall light-mixing uniformity of the cap 18. The first color shift area A1 is located near the first lighting unit 40 along the longitudinal direction L, and the color of the first ink layer 34 corresponds to the color of the second color light L2 (i.e., red). The second ink layer 36 is formed on the light-blocking sheet 30. The second ink layer 36 is formed corresponding to a second color shift area A2 of the symbol 20 (the color shift range shown in FIG. 2, but not limited thereto) in FIG. 2 as an example, but the forming position of the second ink layer 36 is not limited thereto, meaning that as long as the second ink layer 36 is formed on the light-blocking sheet 30, whether light is directly incident to the keyswitch body 12 or travels from the light guide plate 28 to the keyswitch body 12, the second ink layer 36 can improve the overall light-mixing uniformity of the cap 18. The second color shift area A2 is located near the second lighting unit 42 along the longitudinal direction L, and the color of the second ink layer 36 corresponds to the color of the first color light L1 (i.e., blue). In this embodiment, the first ink layer 34 and the second ink layer 36 could be preferably in a fan shape along the longitudinal direction L (but not limited thereto, meaning that the present invention could adopt other pattern designs, such as square, circle, grid, etc.) and are symmetrically arranged. Fan angles of the first ink layer 34 and the second ink layers 36 could be preferably between 110° and 150° (but not limited thereto) and can together define a circular area 46 (a circular dotted area as shown in FIG. 1). The backlight source 38 is disposed at a center of the circular area 46, and a diameter of the circular area 46 could be preferably from two to ten times a length of the backlight source 38 along the longitudinal direction L (but not limited thereto). Further, the first ink layer 34 and the second ink layer 36 have a light emitting hole area 35 corresponding to the third lighting unit 44, and a diameter of the light emitting hole area 35 could be preferably greater than or equal to the length of the backlight source 38 along the longitudinal direction L (e.g., the diameter of the light emitting hole area 35 is 1.2 times the length of the backlight source 38 along the longitudinal direction L, but the present invention is not limited thereto). This allows the third color light L3 (green light) emitted upward by the third lighting unit 44 to directly pass through the transparent region 31, the light emitting hole area 35, and the through hole area 15 and be incident to the keyswitch body 12, thereby enhancing the utilization efficiency of the third color light L3 and the lighting brightness of the symbol 20.

Figure 3:
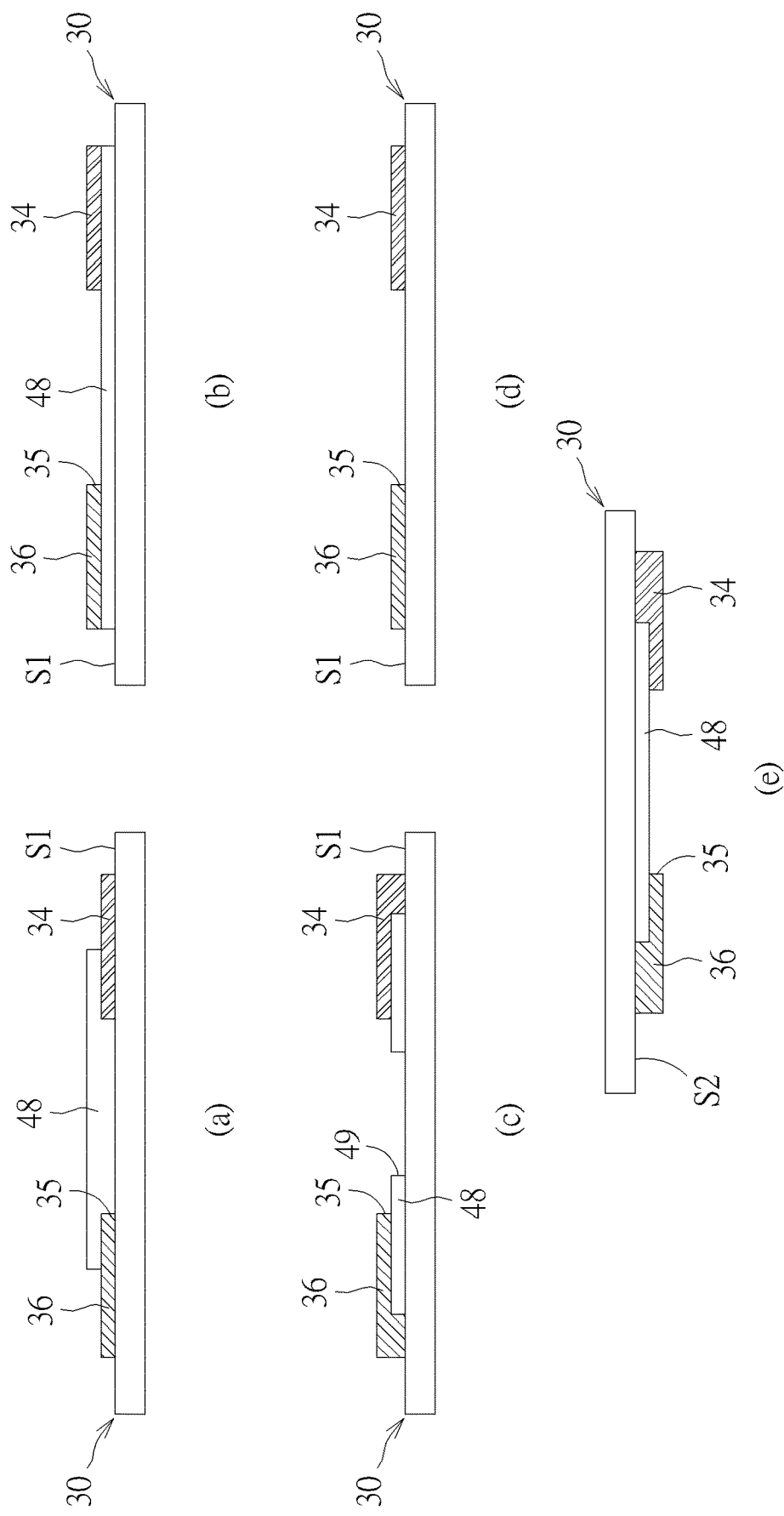
FIG. 3 is a diagram showing different ink layer configurations according to different embodiments of the present invention.

Furthermore, in practical application, to further enhance the utilization efficiency of light of the backlight source 38 being incident to the light guide plate 28, the backlight module 16 could further include a white ink layer 48. The white ink layer 48 is formed on the light-blocking sheet 30 corresponding to the first ink layer 34 and the second ink layer 36 to at least partially reflect light emitted upward by the backlight source 38, so as to reflect the light back and forth to be incident to the light guide plate 28. The white ink layer 48 could be formed in a circular shape between the light-blocking sheet 30 and the first and second ink layers 34 and 36, and could partially overlap with the first and second ink layers 34 and 36 (as shown in FIG. 1). The white ink layer 48 and the first and second ink layers 34 and 36 could be preferably formed on an upper surface S1 of the light-blocking sheet 30, but the present invention is not limited thereto, meaning that the present invention could adopt other ink layer stacking designs, and the stacking orders, overlapping ratios, and light emitting hole configurations could be varied according to the practical lighting application of the backlight module 16. For example, as shown in FIG. 3(a), the first ink layer 34 and the second ink layer 36 could be formed between the light-blocking sheet 30 and the white ink layer 48 and partially overlap with the white ink layer 48; as shown in FIG. 3(b), the white ink layer 48 could be formed between the light-blocking sheet 30 and the first and second ink layers 34 and 36 and completely overlap with the first and second ink layers 34 and 36; as shown in FIG. 3(c), the white ink layer 48 could be formed between the light-blocking sheet 30 and the first and second ink layers 34 and 36 and partially overlap with the first and second ink layers 34 and 36, the first and second ink layers 34 and 36 could have the light emitting hole area 35 formed corresponding to the third lighting unit 44, and the white ink layer 48 could have a light emitting hole area 49 smaller than the light emitting hole area 35 (but not limited thereto, meaning that the present invention could adopt the design that the light emitting hole area 35 and the light emitting hole area 49 have the same diameter); as shown in FIG. 3(d), in the embodiment that the white ink layer 48 is omitted, the first ink layer 34 and the second ink layer 36 could be directly formed on the light-blocking sheet 30; as shown in FIG. 3(e), the white ink layer 48 could be formed between the light-blocking sheet 30 and the first and second ink layers 34 and 36 and the white ink layer 48 and the first and second ink layers 34 and 36 could be formed on a lower surface S2 of the light-blocking sheet 30. As for other derived embodiments (e.g., the embodiment that the first ink layer 34 and the second ink layer 36 are formed between the light-blocking sheet 30 and the white ink layer 48 and the white ink layer 48 has the light emitting hole area 49 smaller than the light emitting hole area 36), the related description could be reasoned by analogy according to FIG. 2 and FIG. 3 and omitted herein.

In summary, the backlight keyswitch provided by the present invention can utilize the first ink layer to partially filter the first color light and utilize the second ink layer to partially filter the second color light. This design can eliminate the color shift problem that the first color shift area of the symbol close to the first lighting unit may show a lighting color shifting to the first color light while the second color shift area of the symbol close to the second lighting unit may show a lighting color shifting to the second color light. In such a manner, the present invention can efficiently solve the prior art problem that lighting color shift occurs in the area of the symbol closer to the LED chip, so as to greatly enhance the lighting uniformity and the visual effect of the backlight keyswitch in use.

Figure 4:
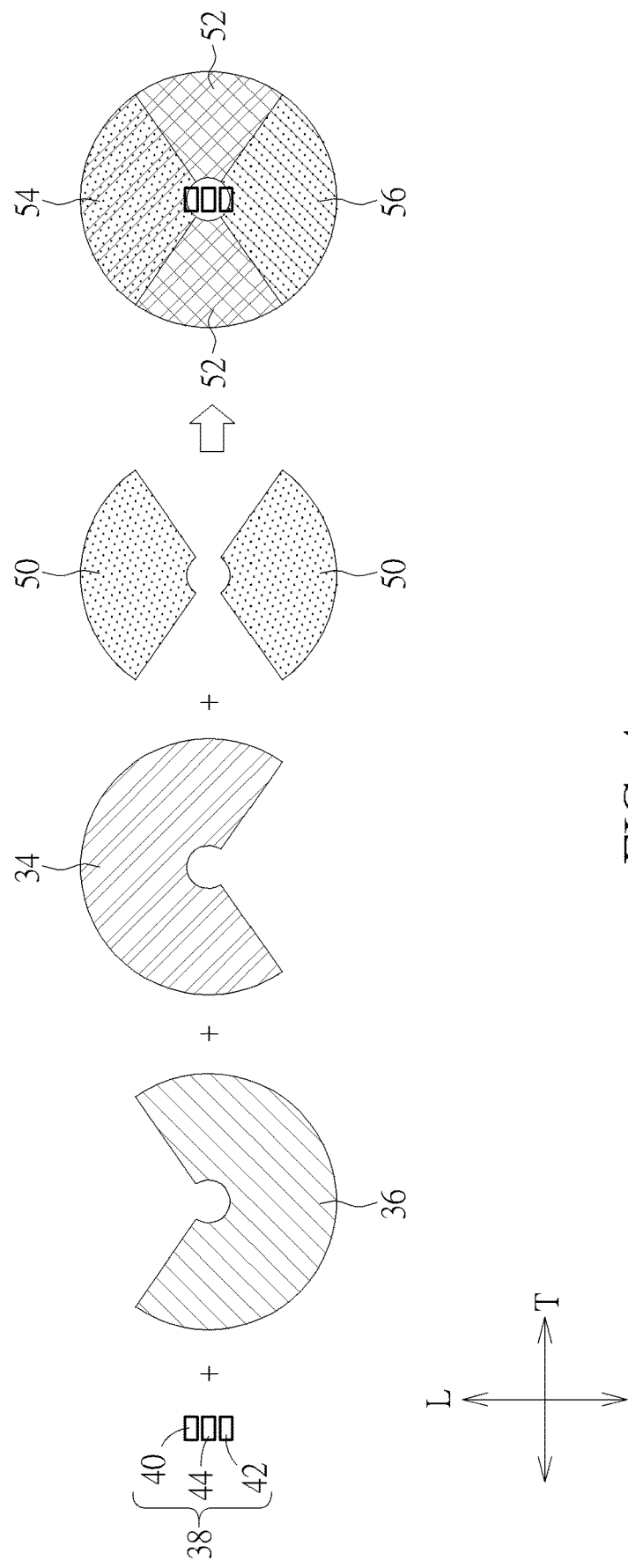
FIG. 4 is a configuration diagram of a backlight source with a first ink layer, a second ink layer and a third ink layer according to another embodiment of the present invention.

To be noted, the ink layer design is not limited to the aforesaid embodiments. The present invention could also adopt a complementary color design. For example, please refer to FIG. 4, which is a configuration diagram of the backlight source 38 with the first ink layer 34, the second ink layer 36 and the third ink layer 50 according to another embodiment of the present invention. In this embodiment, the backlight module 16 could further include two third ink layers 50, and the fan angle of the first ink layer 34 and the second ink layer 36 could be greater than 180°, so as to make the first ink layer 34 and the second ink layer 36 overlap partially to form two complementary ink layers 52 (magenta formed from red and blue), producing a complementary mixed light effect for the third lighting unit 44. On the other hand, the two third ink layers 50 preferably correspond to the third color light L3 (i.e., green), and could be fan-shaped in the longitudinal direction L and formed on the light-blocking sheet 30 respectively corresponding to the first ink layer 34 and the second ink layer 36. Accordingly, the first ink layer 34 could partially overlap with the third ink layer 50 to form a complementary ink layer 54 (yellow formed from red and green) for the first lighting unit 40, and the second ink layer 36 could overlap with the third ink layer 50 to form a complementary ink layer 56 (cyan formed from blue and green) for the second lighting unit 42. On the other hand, the present invention could also adopt a single-layer complementary ink layer design. In another embodiment, the first ink layer 34 can directly adopt a single-layer ink design that the ink color is a complementary color (i.e., yellow) to the first color light L1, and the second ink layer 36 can directly adopt a single-layer ink design that the ink color is a complementary color (i.e., cyan) to the second color light L2.

Figure 5:
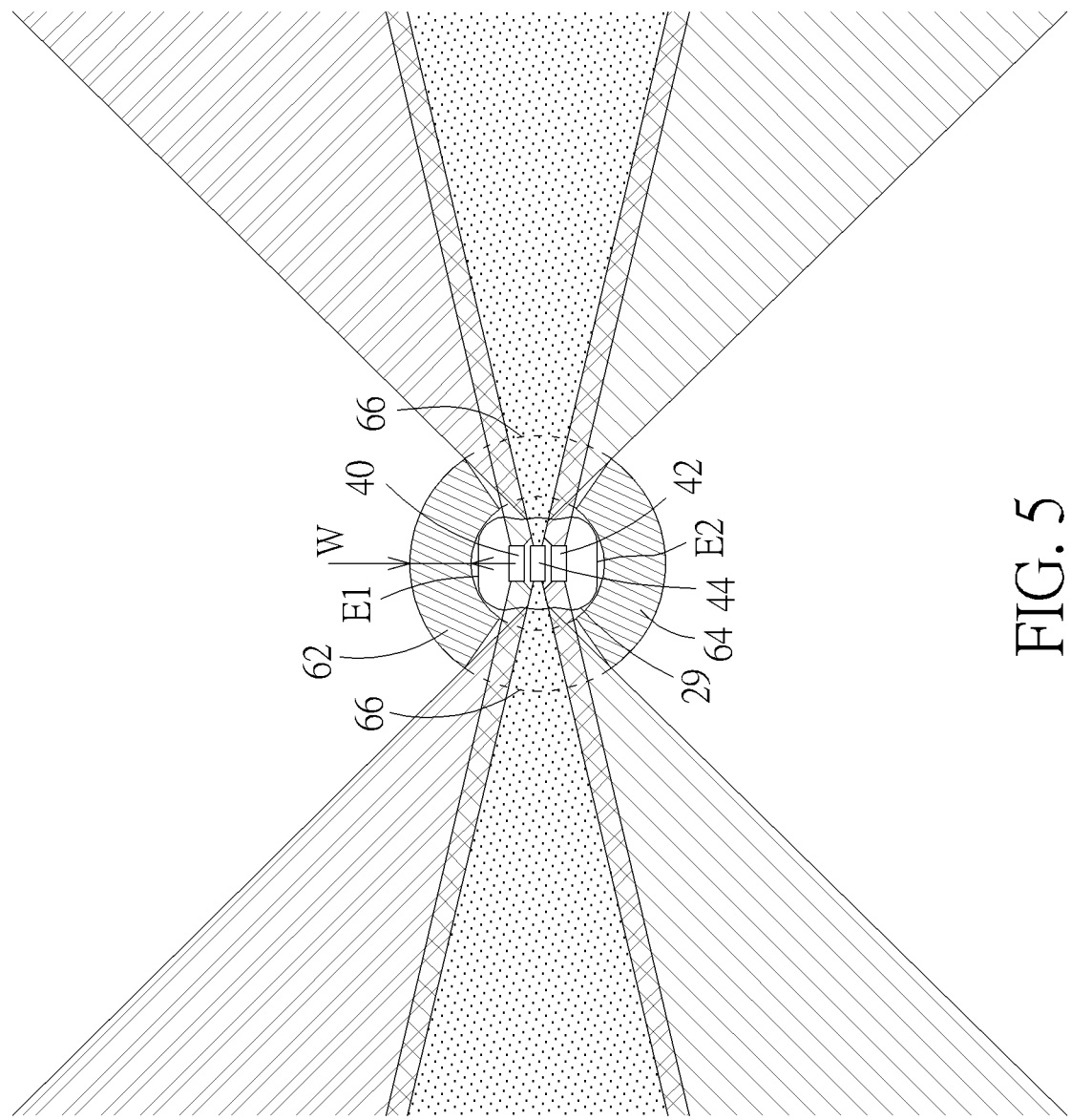
FIG. 5 is an enlarged top view of the backlight source, a first adhesive layer, a second adhesive layer, and an accommodating hole in FIG. 2.

It should be mentioned that that the present invention could adopt an adhesive gap design using the good light coupling characteristic of the transparent adhesive material for enhancing the light mixing effect, so as to further eliminate the color shift problem on the cap 18 of the backlight keyswitch 10. For example, please refer to FIGS. 1, 2, and 5. FIG. 5 is an enlarged top view of the backlight source 38, a first adhesive layer 62, a second adhesive layer 64, and the accommodating hole 29 in FIG. 2. As shown in FIGS. 1, 2, and 5, at least one symbol 58 (only one is shown on the side of the cap 18 in FIG. 1 as an example, but the number, forming positions, and sizes of symbols are not limited thereto) could be formed on the cap 18. The support plate 14 has a through hole area 60 corresponding to the symbol 58. The backlight module 16 could further include a first adhesive layer 62 and a second adhesive layer 64. The first adhesive layer 62 is attached between the light-blocking sheet 30 and the light guide plate 28 and extends along a first hole edge E1 of the accommodating hole 29 corresponding to the first lighting unit 40. The second adhesive layer 64 is attached between the light-blocking sheet 30 and the light guide plate 28 and extends along extends along a second hole edge E2 of the accommodating hole 29 corresponding to the second lighting unit 40. The first adhesive layer 62 and the second adhesive layer 64 could be preferably in a fan shape in the longitudinal direction L and could be symmetrically arranged, so as to together define at least one adhesive gap area 66 (the adhesive gap area 66 could be regarded as a first adhesive gap area and there are two adhesive gap areas 66 shown in FIG. 5, but the present invention is not limited thereto) in the transverse direction T of the cap 18. A fan angle of the first adhesive layer 62 could be preferably 120°, and a projection width W of the first adhesive layer 62 in the longitudinal direction L could be preferably between 0.4 mm and 1.2 mm (this angle and width design could also be applied to the second adhesive layer 64), but the present invention is not limited thereto, meaning that the angle/width of the adhesive layer could be varied according to the practical symbol lighting application of the backlight keyswitch 10.

Via the aforesaid design, the first color light L1, the second color light L2, and the third color light L3 can be guided and mixed by the light guide plate 28 and sequentially pass through the transparent region 31 of the light-blocking sheet 30 and the through hole area 60 of the support plate 14 to be incident to the symbol 58, so as to generate the symbol lighting effect. During the light mixing process within the light guide plate 28, scattering and absorption of the first color light L1 occur at the first adhesive layer 62, which not only reduces the first color light L1 entering a first color shift area A1' of the symbol 58 near the first lighting unit 40 to improve the color shift problem, but also scatters the first color light L1 to be incident to a second color shift area A2' of the symbol 58 near the second lighting unit 42, so as to generate a color compensation effect for further improving the color shift problem that the lighting color of the second color shift area A2' is shifted to the color of the second color light L2. Similarly, scattering and absorption of the second color light L2 occur at the second adhesive layer 64, which not only reduces the second color light L2 entering the second color shift area A2' of the symbol 58 to improve the color shift problem, but also scatters the second color light L2 to be incident to the first color shift area A1' of the symbol 58, so as to generate a color compensation effect for further improving the color shift problem that the lighting color of the first color shift area A1' is shifted to the color of the first color light L1.

In summary, the backlight keyswitch provided by the present invention adopts the adhesive gap design in which the first adhesive layer and the second adhesive layer respectively scatter/absorb the first color light and the second color light and the first color light and the second color light can be scattered toward the second color shift area and the first color shift area respectively through the adhesive gap area. As such, the present invention can eliminate the color shift problem that the lighting color of the first color shift area of the symbol is shifted to the color of the first color light and the lighting color of the second color shift area of the symbol is shifted to the color of the second color light. Therefore, the present invention can enhance the lighting uniformity and the visual effect of the backlight keyswitch in use.

To be noted, the aforesaid adhesive layer design could also be applied to the backlight circuit board and the light guide plate. For example, as shown in FIG. 2, the backlight keyswitch 10 could further include a reflective layer 68, a third adhesive layer 70, and a fourth adhesive layer 72. The reflective layer 68 is formed on the backlight circuit board 32 to reflect light emitted downward from the light guide plate 28 back to the light guide plate 28. The third adhesive layer 70 is attached between the reflective layer 68 and the light guide plate 28 and extends along the first hole edge E1 of the accommodating hole 29 corresponding to the first lighting unit 40. The fourth adhesive layer 72 is attached between the reflective layer 68 and the light guide plate 28 and extends along the second hole edge E2 of the accommodating hole 29 corresponding to the second lighting unit 42, so as to define another adhesive gap area (which could be regarded as a second adhesive gap area) in the transverse direction T together with the third adhesive layer 70. The adhesive extension angles/widths of the third adhesive layer 70 and the fourth adhesive layer 72 and the adhesive gap area configuration could be reasoned by analogy according to FIG. 5 and omitted herein.

Via the aforesaid design, when the first color light L1 is incident to the third adhesive layer 70, it may cause light scattering/absorption, thereby reducing the first color light L1 entering the first color shift area A1' to improve the color shift problem. At the same time, this design can also scatter the first color light L1 to the second color shift area A2' through the aforementioned adhesive gap area for achieving color compensation. Similarly, when the second color light L2 is incident to the fourth adhesive layer 72, it may cause light scattering/absorption, thereby reducing the second color light L2 entering the second color shift area A2' to improve the color shift problem. At the same time, this design can also scatter the second color light L2 to the first color shift area A1' through the aforementioned adhesive gap area for achieving color compensation. To be noted, the present invention could also adopt a design that the adhesive layers are only disposed between the reflective layer 68 and the light guide plate 28. For example, in another embodiment, the backlight keyswitch 10 only attaches the first adhesive layer 62 and the second adhesive layer 64 between the reflective layer 68 and the light guide plate 28. The first adhesive layer 62 extends along the first hole edge E1 of the accommodating hole 29 corresponding to the first lighting unit 40, and the second adhesive layer 64 extends along the second hole edge E2 of the accommodating hole 29 corresponding to the second lighting unit 42, so as to define an adhesive gap area between the reflective layer 68 and the light guide plate 28 in the transverse direction T together with the first adhesive layer 62. As for other related descriptions for this embodiment, it could be reasoned by analogy according to FIG. 5 and omitted herein.

Figure 6:
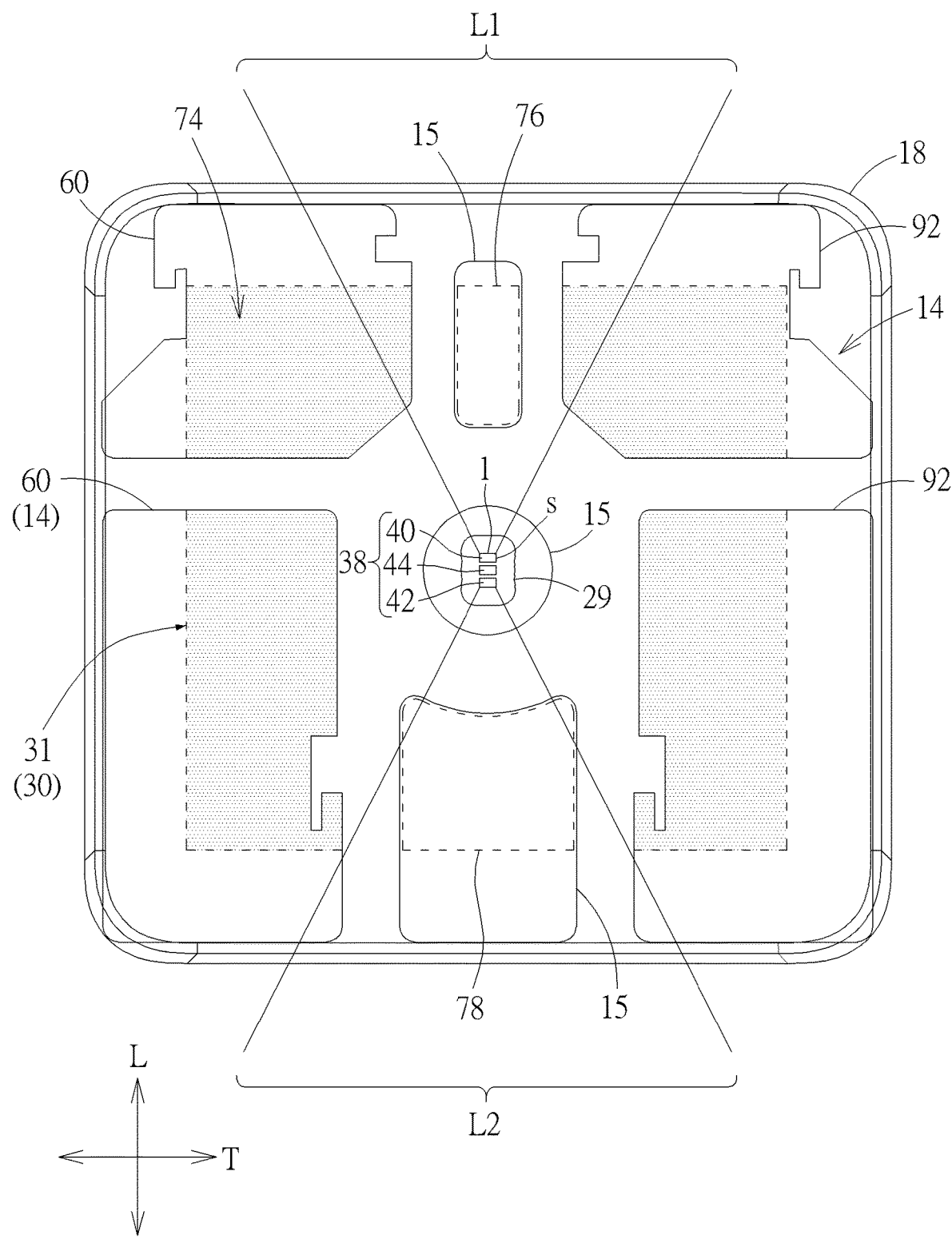
FIG. 6 is a top view of the cap, a support plate, the backlight source, and a light guide plate in FIG. 2.

In addition, for further improving the color shift problem on the symbol, the present invention could adopt a micro optical layer clearance design. For example, please refer to FIG. 1, FIG. 2, and FIG. 6. FIG. 6 is a top view of the cap 18, the support plate 14, the backlight source 38, and the light guide plate 28 in FIG. 2. As shown in FIGS. 1, 2, and 6, the backlight module 16 further includes a micro optical layer 74 formed corresponding to the transparent region 31 of the light-blocking sheet 30 (as shown by the dashed line area in FIG. 6, but not limited thereto) to guide the first color light L1, the second color light L2, and the third color light L3 to illuminate the symbol 58 through the light guide plate 28. A first clearance area 76 (as shown by the dashed line area in FIG. 6, but not limited thereto) is formed on the micro optical layer 74 and is adjacent to the first lighting unit 40 in the longitudinal direction L. A second clearance area 78 (as shown by the dashed line area in FIG. 6, but not limited thereto) is formed on the micro optical layer 74 and is adjacent to the second lighting unit 42 in the longitudinal direction L. The micro optical layer 74 could be disposed in parallel to the light guide plate 28 (e.g., formed on the upper or lower surface of the light guide plate 28, but not limited thereto, meaning that the present invention could adopt the design in which the micro optical layer 74 is formed on an upper surface of the backlight circuit board 32 or the reflective layer 68) and could adopt a micro-dot structure design (but not limited thereto, meaning that the present invention could adopt other optical scattering designs, such as a metallic paint/white paint design, a concave-convex dot structure design, and a continuous linear microstructure design). The micro optical layer 74 adopts a configuration in which micro-structures are removed within the first clearance area 76 and the second clearance area 78.

Furthermore, in this embodiment, as shown in FIG. 6, long sides 1 of the first lighting unit 40, the second lighting unit 42, and the third lighting unit 44 could be perpendicular to the longitudinal direction L, and the first clearance area 76 and the second clearance area 78 could correspond to the long sides 1 of the first lighting unit 40 and the second lighting unit 42, respectively. That is, the three lighting units 40/42/44 are arranged in sequence and their long sides 1 are adjacent to each other, or the three lighting units 40/42/44 are aligned collinearly by their short sides s, but the present invention is not limited thereto. In another embodiment, the first lighting unit 40, the second lighting unit 42 and the third lighting unit 44 are arranged with their short sides s perpendicular to the longitudinal direction L, meaning that the three lighting units 40/42/44 are arranged collinearly by their long sides or are arranged in sequence by their short sides (see the dotted block in FIG. 7). The first clearance area 76 and the second clearance area 78 correspond to the short sides s of the first lighting unit 40 and the second lighting unit 42, respectively. This can reduce the light emitting area of the first lighting unit 40, the second lighting unit 42 and the third lighting unit 44 in the longitudinal direction L, thereby reducing the color shift phenomenon of the symbol 20 in the longitudinal direction L. To be noted, the arrangement of the first lighting unit 40, the second lighting unit 42 and the third lighting unit 44 with their long or short sides perpendicular to the longitudinal direction L could be applied to other embodiments of the present invention, and the related description could be reasoned by analogy according to FIG. 6 and omitted herein.

As a result, via the aforesaid micro optical layer clearance design, the present invention can reduce the first color light entering the first color shift area of the symbol and reduce the second color light entering the second color shift area of the symbol. This ensures that a first mixed color obtained from the first color light, the third color light, and the second color light mixed in the first clearance area is similar to a second mixed color obtained from the first color light, the third color light, and the second color light mixed in the second clearance area, so as to effectively eliminate the color shift problem that the first color shift area of the symbol close to the first lighting unit may show a lighting color shifting to the first color light while the second color shift area of the symbol close to the second lighting unit may show a lighting color shifting to the second color light. In such a manner, the present invention can efficiently solve the prior art problem that lighting color shift occurs in the area of the symbol closer to the LED chip, so as to greatly enhance the lighting uniformity and the visual effect of the backlight keyswitch in use.

Figure 7:
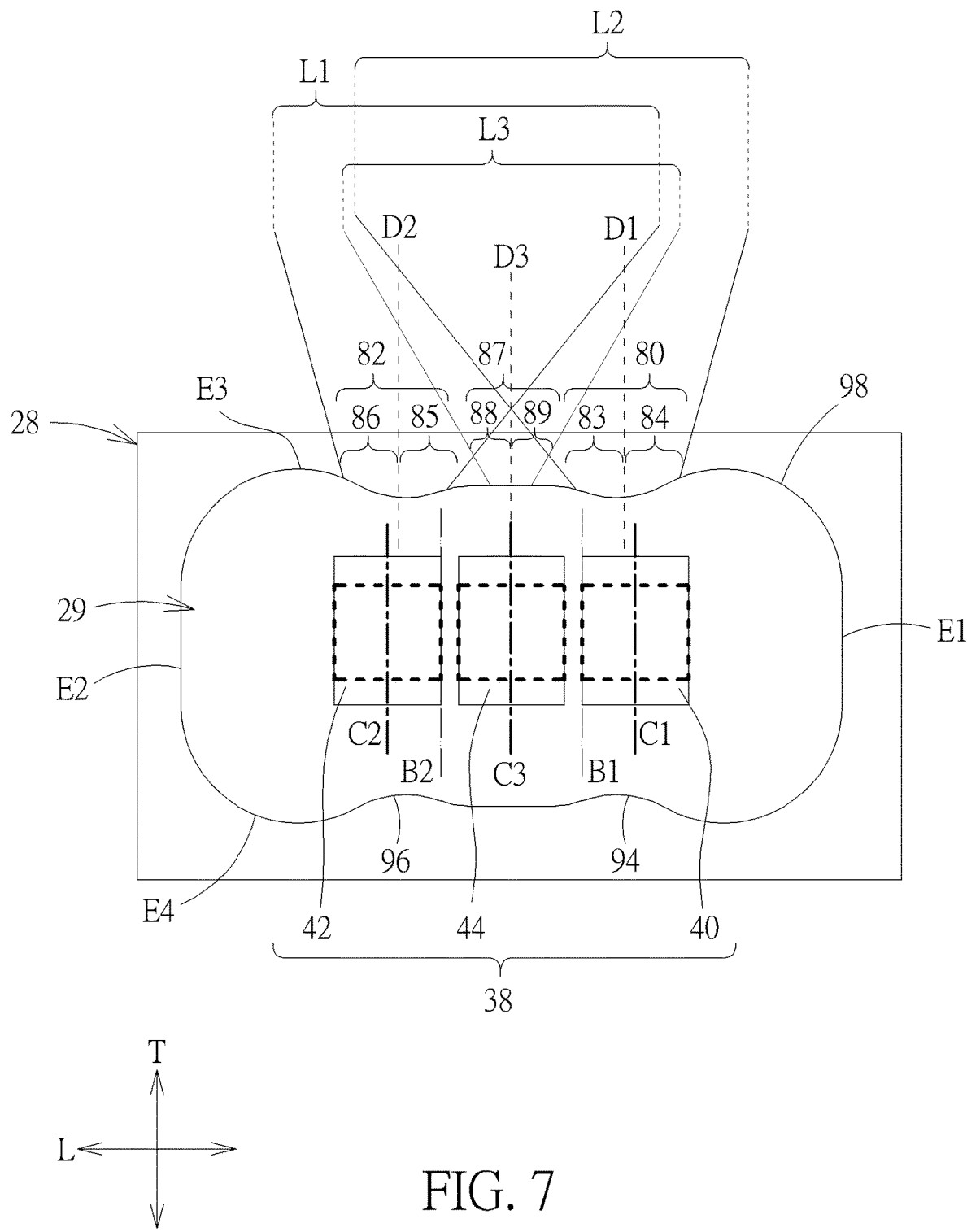
FIG. 7 is an enlarged top view of the backlight source disposed in the accommodating hole of the light guide plate in FIG. 1.
Figure 8:
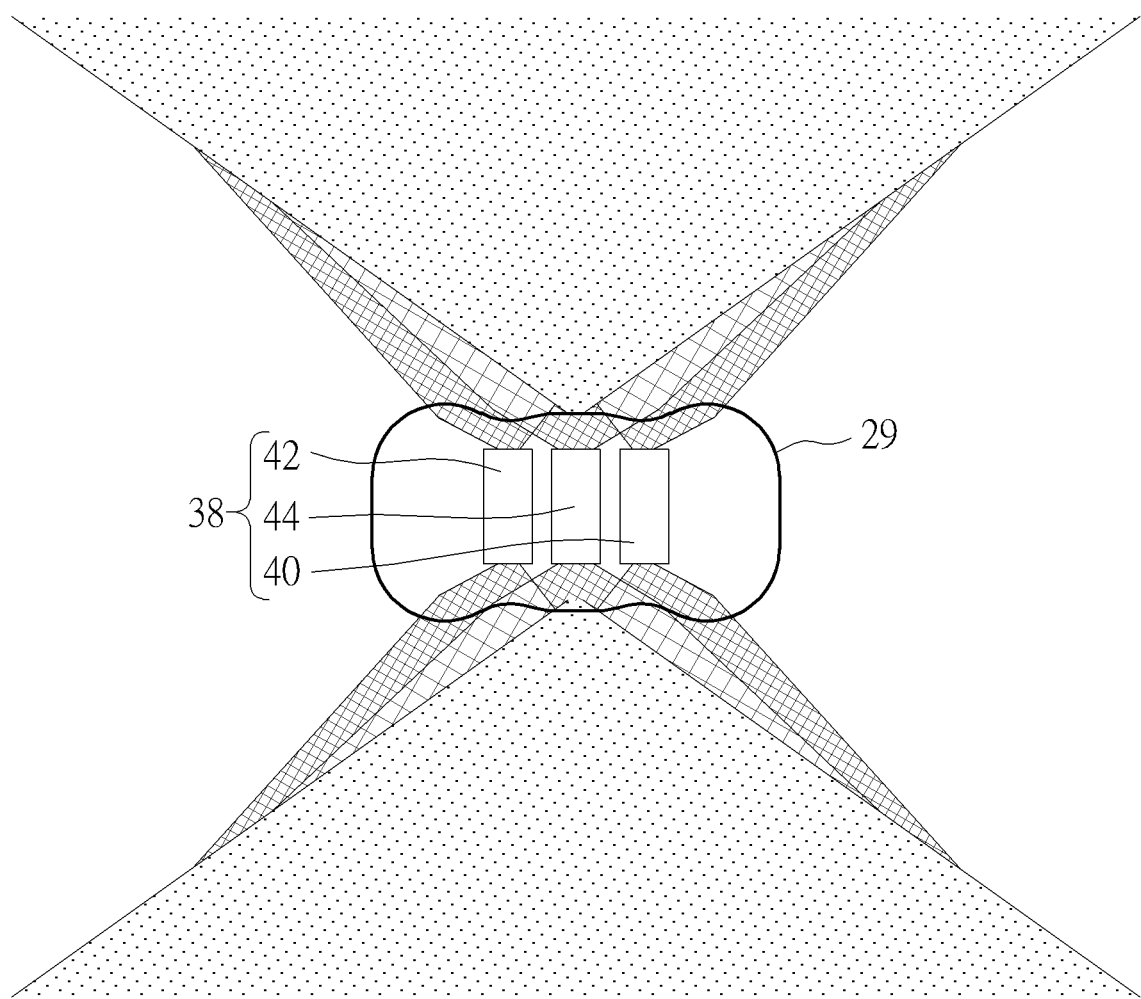
FIG. 8 is a light output diagram of the backlight source disposed in the accommodating hole in FIG. 7.

In practical application, the present invention could further adopt a design in which non-linear sections are formed on a hole wall of the accommodating hole of the light guide plate to evenly mix the first color light, the second color light, and the third color light, so as to enhance the effect of eliminating color shift in light mixing. For example, please refer to FIGS. 1, 7, and 8. FIG. 7 is an enlarged top view of the backlight source 38 disposed in the accommodating hole 29 of the light guide plate 28 in FIG. 1. FIG. 8 is a light output diagram of the backlight source 38 disposed in the accommodating hole 29 in FIG. 7. As shown in FIGS. 1, 7, and 8, the support plate 14 has the through hole area 60 (could be regarded as the first through hole area) corresponding to the symbol 58 (could be regarded as the first symbol). A first hole wall E3 of the accommodating hole 29 corresponding to the symbol 58 could at least include a first section 80 and a second section 82 formed in a non-linear manner. The first section 80 and the second section 82 respectively correspond to the first lighting unit 40 and the second lighting unit 42. A connection line between the first section 80 and the second section 82 is substantially perpendicular to the transverse direction T. The aforesaid non-linear manner could be interpreted as an edge curve of the first section 80 and the second section 82 from the top view.

The first section 80 is used to guide the first color light L1 from the first lighting unit 40 toward the second section 82. The first section 80 could further be divided into a first inner area 83 and a first outer area 84. The first outer area 84 could be inclined toward the second section 82, and the first inner area 83 could be inclined toward the first outer area 84. Furthermore, the first section 80 could form a convex surface facing the first lighting unit 40. In this embodiment, a boundary line D1 between the first inner area 83 and the first outer area 84 could point toward a position between a center axis C1 of the first lighting unit 40 and an edge B1 near the second lighting unit 42. The first inner area 83 and the first outer area 84 of the first section 80 could selectively be in a non-spherical, hyperbolic, or reflex curve shape, and the actual shape design depends on the design demand. The first inner area 83 mainly guides the first color light L1 toward the second section 82, while the first outer area 84 guides the first color light L1 to output toward the transverse direction T from the backlight source 38.

The second section 82 is used to guide the second color light L2 from the second lighting unit 42 toward the first section 80. The second section 82 could further be divided into a second inner area 85 and a second outer area 86. The second outer area 86 could be inclined toward the first section 80, and the second inner area 85 could be inclined toward the second outer area 86. Furthermore, the second section 82 could form a convex surface facing the second lighting unit 42. In this embodiment, a boundary line D2 between the second inner area 85 and the second outer area 86 could point toward a position between a center axis C2 of the second lighting unit 42 and an edge B2 near the first lighting unit 40. The second inner area 85 and the second outer area 86 of the second section 82 could selectively be in a non-spherical, hyperbolic, or reflex curve shape, which could be identical to or different from the first inner area 83 and the first outer area 84, and the actual shape design depends on the design demand. The second inner area 85 mainly guides the second color light L2 toward the first section 80, while the second outer area 86 guides the second color light L2 to output toward the transverse direction T from the backlight source 38.

In addition, as shown in FIGS. 7 and 8, the first hole wall E3 of the accommodating hole 29 could further have a light guiding section 87. The light guiding section 87 is located between the first section 80 and the second section 82 and corresponds to the third lighting unit 44. A distance between the light guiding section 87 and the third lighting unit 44 could be greater than a distance between the first section 80 and the first lighting unit 40 and greater than a distance between the second section 82 and the second lighting unit 42. The third color light L3 from the third lighting unit 44 is emitted toward the light guiding section 87 for mixing evenly with the first color light L1 and the second color light L2 over a very short distance to achieve a uniform light mixing effect.

The light guiding section 87 could be a flat surface, a curved surface, a slanted surface, or any combination thereof. If the light guiding section 87 is a flat surface, the third color light L3 is emitted according to the light emission angle of the third lighting unit 44 and may be refracted slightly when passing through the flat surface. If the light guiding section 87 is a curved surface, the light guiding section 87 could selectively be divided into two light guiding areas 88 and 89, which could be in a non-spherical or hyperbolic shape, depending on the design demands. The light guiding areas 88 and 89 could guide the third color light L3 from the third lighting unit 40 toward the first section 80 and the second section 82 respectively for mixing together with the first color light L1 and the second color light L2. In a preferable embodiment, a boundary line D3 between the two light guiding areas 88 and 89 could point toward a center axis C3 of the third lighting unit 44, meaning the boundary line D3 aligns with the center axis C3, or a misalignment error between the boundary line D3 and the center axis C3 is less than a predetermined threshold.

In such a manner, the design that the accommodating hole 29 has the first section 80, the second section 82, and the light guiding section 87 formed thereon can mix the first color light L1, the second color light L2, and the third color light L3 over a very short distance in the transverse direction T to achieve a uniform light mixing effect. This allows the first color light L1, the second color light L2, and the third color light L3 to mix evenly within the light guide plate 28 to be incident to the symbol 58, thereby enhancing the color shift elimination effect.

To be noted, the aforesaid light refracting design of the light guide plate could also be applied to another hole wall of the accommodating hole 29. To be brief, as shown in FIGS. 1, 7, and 8, at least one symbol 90 (one shown in FIG. 1, but not limited thereto, wherein the symbol 90 could be regarded as the second symbol) could be formed on the cap 18. The support plate 14 has at least one through hole area 92 (two shown in FIG. 1, but not limited thereto, wherein the through hole area 92 could be regarded as the second through hole area) corresponding to the symbol 90. A second hole wall E4 of the accommodating hole 29 corresponding to the symbol 90 is divided into a third section 94 and a fourth section 96 in a non-linear manner respectively corresponding to the first lighting unit 40 and the second lighting unit 42. The first hole wall E3 and the second hole wall E4 are respectively located on opposite sides of the backlight source 38. The third and fourth sections 94 and 96 and the first and second sections 80 and 82 are respectively located on the opposite sides of the backlight source 38. The third section 94 directs the first color light L1 from the first lighting unit 40 toward the fourth section 96, and the fourth section 96 directs the second color light L2 from the second lighting unit 42 toward the third section 94, so as to make the first color light L1, the second color light L2, and the third color light L3 mixed in the light guide plate 28 to be incident to the symbol 90. As for other related description for the second hole wall E4 of the accommodating hole 29, it could be reasoned by analogy according to the detailed description for the first hole wall E3 of the accommodating hole 29 and omitted herein.

As shown in FIG. 8, the output light with several colors (which means an illumination range drawn in grid) emitted by the backlight source 38 can complete a light mixing function within a light mixing extension distance about 2 mm at a side of the backlight source 38, so that the white light (which means an illumination range drawn in dots) can be emitted to illuminate the backlight keyswitch 10.

Furthermore, in FIG. 7, the long sides 1 of the three lighting units 40/42/44 could be perpendicular to the longitudinal direction L, meaning that the three lighting units 40/42/44 are arranged in sequence and their long sides 1 are adjacent to each other, or the three lighting units 40/42/44 are aligned collinearly by their short sides s. Alternatively, the three lighting units 40/42/44 could be arranged with their short sides s perpendicular to the longitudinal direction L, meaning that the three lighting units 40/42/44 are collinearly aligned by their long sides, or the three lighting units 40/42/44 are arranged in sequence and their short sides are adjacent to each other (as shown in FIG. 7).

The backlight module according to an embodiment of the present invention adopts the design that the first section, the second section, and the third section of the accommodating hole facing the lateral sides of the lighting units are in an arc curve shape (i.e., the aforesaid non-spherical, hyperbolic, or reflex curve shape). The actual shape design is not limited to the aforementioned embodiments. The junction between the arc curve and other linear side of the accommodating hole could be chamfered. For example, a chamfered section 98 is formed between the first section 80 and the first hole edge E1 (preferably a linear edge) of the accommodating hole 29 along the longitudinal direction L corresponding to the first lighting unit 40. The aforesaid arc curve could also be composed of multiple linear segments, meaning that the arc curves of the first section, the second section, and the third section could be replaced by multiple linear segments in another embodiment. As long as the first section, the second section, and the third section are at least partially not parallel to the longitudinal direction, they can still provide the aforementioned good light mixing function.

In summary, according to the illumination distribution curve and the usage requirements of the backlight source 38, the backlight keyswitch 10 of the present invention can adjust the curvature of the hole wall of the accommodating hole 29 to improve the light mixing effect of the backlight source 38 for more lighting uniformity and avoiding the color shift problem. The light mixing function of the backlight source 38 is not limited to the two-color light mixing embodiment or the three-color light mixing embodiment, and depends on the design demand. The light mixing extension distance in the prior art is about 7 mm to 15 mm. Compared with the prior art, the present invention can greatly shorten the light mixing extension distance to less than 2 mm, thereby reducing the waste of mechanical space and product weight.

It should be mentioned that the ink layer design, the adhesive gap design, the micro optical layer clearance design, and the accommodating hole section design mentioned in the aforesaid embodiments could be implemented separately or interactively to enhance the design flexibility of the backlight keyswitch of the present invention in eliminating the lighting color shift of the symbol on the cap. For example, in the embodiment that the micro optical layer clearance design and the accommodating hole section design, the backlight keyswitch of the present invention could only adopt the ink layer design and the adhesive gap design to improve the lighting color shift of the symbol on the cap. As for other derived embodiments (e.g., the embodiment that only the ink layer design is adopted or the embodiment that the adhesive gap design, the micro optical layer clearance design, and the accommodating hole section design are adopted), the related description could be reasoned by analogy and omitted herein. To be noted, the through hole area mentioned in the aforesaid embodiments (e.g., the through hole areas 15, 60, 92) can be regarded as the transparent regions of the support plate 14. In other words, the light permeable design of the support plate adopted by the present invention is not limited to the design that the through hole areas are formed on the non-transparent support plate (e.g., metal support plate) for allowing light to pass therethrough. The present invention could also adopt the design that the through hole areas are formed on the transparent support plate (e.g., plastic support plate) for allowing light to pass therethrough. As for which design is adopted, it depends on the practical application of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight keyswitch comprising:
   a keyswitch body having a cap with at least one symbol formed thereon; and
   a backlight module disposed under the cap, the backlight module comprising:
   a backlight circuit board having a backlight source, the backlight source comprising a plurality of lighting units arranged sequentially along a longitudinal direction for respectively emitting a plurality of color lights different from each other, the plurality of lighting units comprising a first lighting unit and a second lighting unit disposed at two ends of the plurality of lighting units along the longitudinal direction;
   a light-blocking sheet located above the backlight circuit board, the light-blocking sheet having at least one transparent region;
   a light guide plate located between the light-blocking sheet and the backlight circuit board, the light guide plate having an accommodating hole for accommodating the backlight source; and
   a micro optical layer disposed in parallel to the light guide plate and formed corresponding to the at least one transparent region for guiding the plurality of color lights to emit from the light guide plate, pass through the at least one transparent region, and illuminate the at least one symbol;
   wherein the micro optical layer forms a first clearance area near the first lighting unit in the longitudinal direction, and the micro optical layer forms a second clearance area near the second lighting unit in the longitudinal direction;
   wherein the plurality of color lights are mixed in the first clearance area to obtain a first mixed color, and the plurality of color lights are mixed in the second clearance area to obtain a second mixed color, and the first mixed color is similar to the second mixed color.

2. The backlight keyswitch of claim 1, wherein the plurality of color lights is at least two of red light, blue light and green light.

3. The backlight keyswitch of claim 1, wherein the plurality of lighting units each comprises short sides and long sides, the long sides are arranged perpendicular to the longitudinal direction, and the first clearance area and the second clearance area respectively correspond to the long sides of the first lighting unit and the second lighting unit.

4. The backlight keyswitch of claim 1, wherein the plurality of lighting units each comprises short sides and long sides, the short sides are arranged perpendicular to the longitudinal direction, and the first clearance area and the second clearance area respectively correspond to the short sides of the first lighting unit and the second lighting unit.

5. A backlight keyswitch comprising:
   a keyswitch body having a cap with at least one first symbol formed thereon; and
   a backlight module disposed under the cap, the backlight module comprising:

a backlight circuit board having a backlight source, the backlight source comprising a plurality of lighting units arranged sequentially along a longitudinal direction for respectively emitting a plurality of color lights, the plurality of lighting units comprising a first lighting unit and a second lighting unit disposed at two ends of the plurality of lighting units along the longitudinal direction; and a light guide plate disposed above the backlight circuit board and having an accommodating hole for accommodating the backlight source, a first hole wall of the accommodating hole being divided into a first section and a second section respectively corresponding to the first lighting unit and the second lighting unit, wherein the first section guides a first color light of the plurality of color lights emitted by the first lighting unit toward the second section, the second section guides a second color light of the plurality of color lights emitted by the second lighting unit toward the first section, and the first section and the second section are at least partially not parallel to the longitudinal direction.

6. The backlight keyswitch of claim 5, wherein a connection line between the first section and the second section is perpendicular to a transverse direction.

7. The backlight keyswitch of claim 5, wherein the first section includes a first outer area and a first inner area, and a boundary line between the first outer area and the first inner area points to a position between a center axis of the first lighting unit and an edge near the second lighting unit.

8. The backlight keyswitch of claim 7, wherein the first outer area is inclined toward the second section, and the first inner area is inclined towards the first outer area.

9. The backlight keyswitch of claim 8, wherein the first section forms a convex surface facing the first lighting unit.

10. The backlight keyswitch of claim 5, wherein the second section includes a second outer area and a second inner area, and a boundary line between the second outer area and the second inner area points to a position between a center axis of the second lighting unit and an edge near the first lighting unit.

11. The backlight keyswitch of claim 10, wherein the second outer area is inclined toward the first section, and the second inner area is inclined toward the second outer area.

12. The backlight keyswitch of claim 11, wherein the second section forms a convex surface facing the second lighting unit.

13. The backlight keyswitch of claim 5, wherein at least one of the first section and the second section is in a non-spherical, hyperbolic, or reflex curve shape.

14. The backlight keyswitch of claim 5, wherein the plurality of lighting units comprises a third lighting unit disposed between the first lighting unit and the second lighting unit, the first hole wall of the accommodating hole further has a light guiding section, and the light guiding section is located between the first section and the second section and corresponds to the third lighting unit.

15. The backlight keyswitch of claim 14, wherein a distance between the light guiding section and the third lighting unit is greater than a distance between the first section and the first lighting unit and greater than a distance between the second section and the second lighting unit.

16. The backlight keyswitch of claim 14, wherein the light guiding section is a flat surface, a curved surface, a slanted surface, or any combination thereof.

17. The backlight keyswitch of claim 14, wherein the light guiding section includes two light guiding areas, and the two light guiding areas guide a third color light emitted by the third lighting unit respectively to the first section and the second section.

18. The backlight keyswitch of claim 17, wherein a boundary line of the two light guiding areas points to a center axis of the third lighting unit.

19. The backlight keyswitch of claim 5, wherein a chamfered section is formed between the first section and a linear edge of the accommodating hole along the longitudinal direction corresponding to the first lighting unit.

20. The backlight keyswitch of claim 5, wherein the backlight keyswitch further comprises a support plate, at least one second symbol is formed on the cap, the support plate has at least one second through hole area corresponding to the at least one second symbol, an second hole wall of the accommodating hole corresponding to the at least one second symbol is divided into a third section and a fourth section in a non-linear manner respectively corresponding to the first lighting unit and the second lighting unit, wherein the third section guides the first color light of the first lighting unit toward the fourth section, and the fourth section guides the second color light of the second lighting unit toward the third section, so as to make the plurality of color lights mixed in the light guide plate and pass through the at least one second through hole area to be incident to the at least one second symbol.

21. The backlight keyswitch of claim 20, wherein the third and fourth sections and the first and second sections are respectively located on opposite sides of the backlight source.

22. The backlight keyswitch of claim 20, wherein the first hole wall and the second hole wall are respectively located on opposite sides of the backlight source.

23. The backlight keyswitch of claim 5, wherein the plurality of color lights is at least two of red light, blue light and green light.

24. The backlight keyswitch of claim 5, wherein the plurality of lighting units each comprises short sides and long sides, and the short sides are arranged parallel to the longitudinal direction.

25. The backlight keyswitch of claim 5, wherein the plurality of lighting units each comprises short sides and long sides, and the long sides—are arranged parallel to the longitudinal direction.

26. A backlight module comprising:
a backlight circuit board having a backlight source, the backlight source comprising a plurality of lighting units arranged sequentially along a longitudinal direction for respectively emitting a plurality of color lights different from each other, the plurality of lighting units comprising a first lighting unit and a second lighting unit disposed at two ends of the plurality of lighting units along the longitudinal direction;
a light-blocking sheet located above the backlight circuit board, the light-blocking sheet having at least one transparent region;
a light guide plate located between the light-blocking sheet and the backlight circuit board, the light guide plate having an accommodating hole for accommodating the backlight source; and
a micro optical layer disposed in parallel to the light guide plate and formed corresponding to the at least one transparent region for guiding the plurality of color lights to emit from the light guide plate to the at least one transparent region;
wherein the micro optical layer forms a first clearance area near the first lighting unit in the longitudinal direction, and the micro optical layer forms a second clearance area near the second lighting unit in the longitudinal direction;

wherein the plurality of color lights are mixed in the first clearance area to obtain a first mixed color, and the plurality of color lights are mixed in the second clearance area to obtain a second mixed color, and the first mixed color is similar to the second mixed color.

27. A backlight module comprising:

a backlight circuit board having a backlight source, the backlight source comprising a plurality of lighting units arranged sequentially along a longitudinal direction for respectively emitting at least a first color light and a second color light; and a light guide plate disposed above the backlight circuit board and having an accommodating hole for accommodating the backlight source, a first hole wall of the accommodating hole being divided into a first section and a second section respectively corresponding to a first lighting unit and a second lighting unit of the plurality of lighting units disposed at two ends of the plurality of lighting units along the longitudinal direction, wherein the first section guides the first color light toward the second section, the second section guides the second color light toward the first section, and the first section and the second section are at least partially not parallel to the longitudinal direction.

\* \* \* \* \*